United States Patent
Zhao et al.

(10) Patent No.: US 9,790,346 B2
(45) Date of Patent: Oct. 17, 2017

(54) METHODS FOR RECOVERING CARBON FIBER FROM CARBON-FIBER-REINFORCED POLYMER (CFRP) COMPOSITES

(71) Applicant: EAST CHINA UNIVERSITY OF SCIENCE AND TECHNOLOGY, Shanghai (CN)

(72) Inventors: Chongjun Zhao, Shanghai (CN); Muzi Shitian, Shanghai (CN); Weifeng Ma, Shanghai (CN); Xiuzhen Qian, Shanghai (CN); Jinchao Zhang, Shanghai (CN); Xin Chen, Shanghai (CN)

(73) Assignee: EAST CHINA UNIVERSITY OF SCIENCE AND TECHNOLOGY, Shanghai (CN)

(*) Notice: Subject to any disclaimer, the term of this patent is extended or adjusted under 35 U.S.C. 154(b) by 0 days.

(21) Appl. No.: 14/889,395

(22) PCT Filed: May 8, 2013

(86) PCT No.: PCT/CN2013/075297
§ 371 (c)(1),
(2) Date: Nov. 5, 2015

(87) PCT Pub. No.: WO2014/179939
PCT Pub. Date: Nov. 13, 2014

(65) Prior Publication Data
US 2016/0115301 A1    Apr. 28, 2016

(51) Int. Cl.
*C08K 7/06* (2006.01)
*D01F 9/12* (2006.01)
(Continued)

(52) U.S. Cl.
CPC ............... *C08K 7/06* (2013.01); *C08J 11/08* (2013.01); *D01F 9/12* (2013.01); *C08J 2361/06* (2013.01);
(Continued)

(58) Field of Classification Search
CPC .... C08J 11/08; C08J 2363/00; C08J 2361/06; D01F 9/12; C08K 7/06; Y02W 30/701; C08L 61/06
(Continued)

(56) References Cited

U.S. PATENT DOCUMENTS

2013/0118691 A1* 5/2013 George ............... B29B 17/02
156/704

FOREIGN PATENT DOCUMENTS

CN    102391543    3/2012
CN    102731821    10/2012

OTHER PUBLICATIONS

Dang, W., et al., "An approach to chemical recycling of epoxy resin cured with amine using nitric acid," Polymer, pp. 2953-2958 (2002).
(Continued)

*Primary Examiner* — Daniel C McCracken
(74) *Attorney, Agent, or Firm* — Dorsey & Whitney LLP (57) ABSTRACT

Method for recovering carbon fibers from carbon fiber reinforced polymer composites is provided. The recovered carbon fibers can be separable and can be substantially free of thermosetting resins. Compositions comprising said recovered carbon fibers are also provided.

22 Claims, 10 Drawing Sheets

(51) Int. Cl.
*C08J 11/08* (2006.01)
*C08L 61/06* (2006.01)

(52) U.S. Cl.
CPC .......... *C08J 2363/00* (2013.01); *C08L 61/06* (2013.01); *Y02W 30/701* (2015.05)

(58) Field of Classification Search
USPC .................. 423/447.1; 523/456; 524/323
See application file for complete search history.

(56) References Cited

OTHER PUBLICATIONS

Ibarra, R.M., et al., "Water and Benzyl Alcohol in Subcritical and Supercritical Conditions as means for Carbon Fiber Recovery from Thermoset Composite Materials," pp. 1-6.

Morin, C., et al., "Near- and supercritical solvolysis of carbon fibre reinforced polymers (CFRPs) for recycling carbon fibers as a valuable resource: State of the art," The Journal of Supercritical Fluids, vol. 66, pp. 232-240 (2012).

Nakagawa, M., et al., "Characterization of CFRP Using Recovered Carbon Fibers From Waste CFRP," Part V Solvolysis, The 5th ISFR, pp. 241-244 (Oct. 11-14, 2009).

Yoshiki, S., et al., "Fundamental study on FRP recycling using several solvents," National Institute of Advanced Industrial Science and Technology Institute for Energy Utilization, vol. 208, 99. 120-125 (Jul. 25, 2003) (English Abstract).

International Seach Report and Written Opinion from International Application No. PCT/CN2013/075297 mailed Feb. 13, 2014.

\* cited by examiner

METHODS FOR RECOVERING CARBON FIBER FROM CARBON-FIBER-REINFORCED POLYMER (CFRP) COMPOSITES

CROSS-REFERENCE TO RELATED APPLICATIONS

This application is a U.S. national stage filing under 35 U.S.C. §371 of PCT International Application No. PCT/CN2013/075297 filed on May 8, 2013.

BACKGROUND

Unless otherwise indicated herein, the materials described in this section are not prior art to the claims in this application and are not admitted to be prior art by inclusion in this section.

Composite materials are useful in many industrial fields, such as aeronautics, automobile, and sports, and their usage is increasing. Composite waste has previously been disposed of in landfills or by incineration. However, environmental concerns and potentially new legislative changes on waste disposal motivate the research and development of technologies aimed at recycling these composite materials. Only a few approaches to recovering carbon fibers from carbon fiber reinforced plastics have been reported. There is a need for simple and efficient methods capable of recovering carbon fibers from carbon fiber reinforced plastics.

SUMMARY

In some embodiments, a method of recovering carbon fibers from fiber reinforced composite may include providing a fiber reinforced composite that includes carbon fibers and a thermosetting resin; contacting the composite with a first organic solvent to form carbon fiber bundles; contacting the carbon fiber bundles with an acid solution to form acid-treated carbon fibers; and contacting the acid-treated carbon fibers with a second organic solvent.

In some embodiments, a method of recovering carbon fibers from fiber reinforced composite may include providing a fiber reinforced composite that includes carbon fibers and a thermosetting resin; contacting the composite with a first organic solvent to form carbon fiber bundles; combining the carbon fiber bundles with a second organic solvent to form a mixture; and heating the mixture under solvothermal conditions.

In some embodiments, a composition may include an organic solvent, recycled carbon fibers dispersed in the organic solvent, and a thermosetting resin.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present disclosure generally describes methods related to recovering carbon fibers from fiber-reinforced composites, for example, fiber-reinforce composites comprising carbon fibers and a thermosetting resin. The recovered carbon fibers can be isolated as separable fibers and can be substantially free from thermosetting resin. The method, in some embodiments, includes providing the fiber-reinforced composite; contacting the composite with a first organic solvent to form carbon fiber bundles; contacting the carbon fiber bundles with an acid solution to form acid-treated carbon fibers; and contacting the acid-treated carbon fibers with a second organic solvent. The method can also include: providing the composite; contacting the composite with a first organic solvent to form carbon fiber bundles; combining the carbon fiber bundles with a second organic solvent to form a mixture; and heating the mixture under solvothermal conditions. A composition comprising recycled carbon fibers is also disclosed herein.

Figure 1:
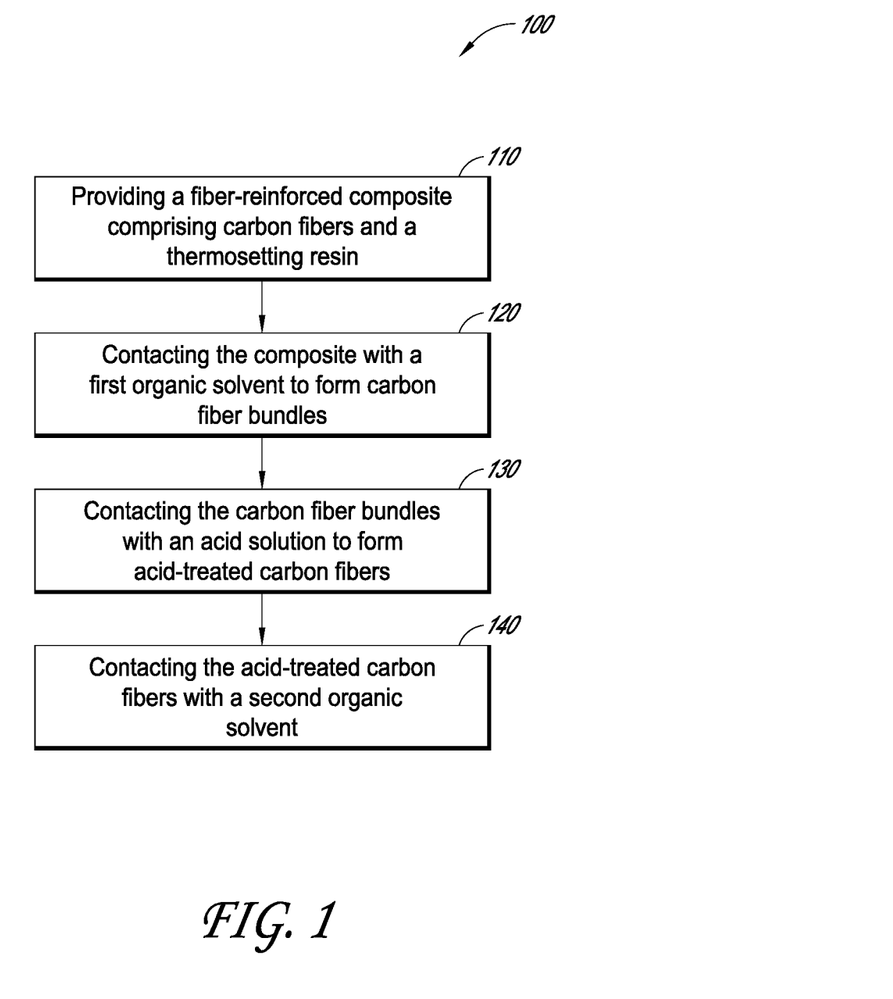
FIG. 1 is a flow diagram illustrating one example of a method of recovering carbon fibers in accordance with at least some examples of the present disclosure.

FIG. 1 is a flow diagram illustrating one example of method 100 of recovering carbon fibers from fiber reinforced composites in accordance with at least some examples of the present disclosure. As illustrated in FIG. 1, method 100 can include one or more functions, operations, or actions as illustrated by one or more of operations 110-140.

Method 100 can begin at operation 110, "Providing a fiber-reinforced composite comprising carbon fibers and a thermosetting resin." Operation 110 can be followed by operation 120, "Contacting the composite with a first organic solvent to form carbon fiber bundles." Operation 120 can be followed by operation 130, "Contacting the carbon fiber bundles with an acid solution to form acid-treated carbon fibers." Operation 130 can be followed by operation 140, "Contacting the acid-treated carbon fibers with a second organic solvent."

In FIG. 1, operations 110-140 are illustrated as being performed sequentially with operation 110 first and operation 140 last. It will be appreciated however that these operations can be reordered, combined, and/or divided into additional or different operations as appropriate to suit particular embodiments. For example, additional operations can be added before, during or after one or more of operations 110-140. In some embodiments, one or more of the operations can be performed at about the same time.

At operation 110, "Providing a fiber-reinforced composite comprising carbon fibers and a thermosetting resin," the thermosetting resin can include an epoxy resin or a phenol resin in accordance with some embodiments. In some embodiments, the fiber-reinforced composite may be a carbon-fiber-reinforced composite. In some embodiments, the thermosetting resin may be an epoxy resin present in the fiber-reinforced composite as a polymer matrix.

At operation 120, "Contacting the composite with a first organic solvent to form carbon fiber bundles," one or more various organic solvents can be used as the first organic solvent. For example, the first organic solvent can be an alcohol. In some embodiments, the first organic solvent may be benzyl alcohol. Operation 120 can include, for example, maintaining the composite and the first organic solvent under conditions that are effective for forming carbon fiber bundles from the fiber-reinforced composite. For example, the composite and the first organic solvent can be maintained at a suitable temperature over a time period sufficient to form the carbon fiber bundles and at which time the mass of the composite no longer increases. In some embodiments, the composite can be heated to about 25° C. to about 300° C. or to about 50° C. to about 200° C., while contacting the first organic solvent. For example, the composite and the first organic solvent can be heated at about 25° C., about 50° C., about 75° C., about 100° C., about 125° C., about 150° C., about 25° C., about 175° C., about 200° C., about 225° C., about 250° C., about 275° C., about 300° C., or a range between any two of these values (including endpoints). The time for which the composite may be contacted with the first organic solvent can vary. For example, the composite can be contacted with the first organic solvent for about 30 minutes, about 1 hour, about 2 hours, about 4 hours, about 6 hours, about 8 hours, about 10 hours, about 12 hours, or a range between any two of these values (including endpoints). In some embodiments, the composite can be contacted with the first organic solvent for greater than 12 hours. In some embodiments, the composite may be contacted with the first organic solvent for about 30 minutes to about 12 hours. In some embodiments, the composite may be contacted with the first organic solvent for at least about 1 hour. Although various non-limiting examples of suitable conditions are described in the disclosed embodiments, the skilled artisan, guided by the teachings of the disclosed embodiments, will appreciate that numerous other conditions may be suitable depending upon various properties of the first organic solvent.

At operation 130, "Contacting the carbon fiber bundles with an acid solution to form acid-treated carbon fibers," the acid solution can be an aqueous acid solution. In some embodiments, the acid solution can be nitric acid. In some embodiments, the concentration of acid in the acid solution can be at least about 1 mol/L. In some embodiments, the concentration of acid in the acid solution may be about 6 mol/L. Specific examples of acid concentrations include about 1 mol/L, about 2 mol/L, about 3 mol/L, about 4 mol/L, about 5 mol/L, about 6 mol/L, and ranges between any two of these values (including endpoints).

Operation 130 can include, for example, maintaining the acid solution and the carbon fiber bundles under conditions that are effective to form acid-treated carbon fibers. For example, the carbon fiber bundles and the acid solution can be maintained at a suitable temperature over a time period that is sufficient for formation of the acid-treated carbon fibers. For example, the carbon fiber bundles can be contacted with the acid solution for about 30 minutes, about 1 hour, about 2 hours, about 4 hours, about 6 hours, about 8 hours, about 10 hours, about 12 hours, or a range between any two of these values (including endpoints). In some embodiments, the carbon fiber bundles may be contacted with the acid solution for about 30 minutes to about 12 hours. In some embodiments, the carbon fiber bundles may be contacted with the acid solution for greater than 12 hours. In some embodiments, the carbon fiber bundles may be contacted with the acid solution for about 100 minutes. The acid solution and the carbon fiber bundles can be heated to various temperatures, such as about 30° C., about 40° C., about 50° C., about 60° C., about 70° C., about 80° C., about 90° C., about 100° C., or a range between any two of these values (including endpoints). In some embodiments, the acid solution and the carbon fiber bundles can be heated to about 30° C. to about 100° C. In some embodiments, the acid solution and the carbon fiber bundles can be heated to least about 40° C. In some embodiments, the acid solution and carbon fiber bundles are heated to a temperature of about 70° C. Although various non-limiting examples of suitable conditions are described in the disclosed embodiments, the skilled artisan, guided by the teachings of the disclosed embodiments, will appreciate that numerous other conditions may be suitable depending upon various properties of the acid solution.

At operation 140, "Contacting the acid-treated carbon fibers with a second organic solvent," one or more various organic solvents can be used as the second organic solvent. For example, the second organic solvent can be an alcohol. In some embodiments, the second organic solvent can be benzyl alcohol. Operation 140 can include, for example, maintaining the acid-treated carbon fibers and the second organic solvent at a suitable temperature over a time period sufficient for obtaining recovered carbon fibers. For example, the acid-treated carbon fibers and the second organic solvent can be heated to about 25° C., about 50° C., about 75° C., about 100° C., about 125° C., about 150° C., about 25° C., about 175° C., about 200° C., about 225° C., about 250° C., about 275° C., about 300° C., or a range between any two of these values (including endpoints). As an example, the acid-treated carbon fibers and the second organic solvent can be heated to about 25° C. to about 300° C., or to about 50° C. to about 200° C. The time for which the acid-treated carbon fibers are contacted with the second organic solvent can also vary. For example, the acid-treated carbon fibers can be contacted with the second organic solvent for about 30 minutes, about 1 hour, about 2 hours, about 4 hours, about 6 hours, about 8 hours, about 10 hours, about 12 hours, or a range between any two of these values (including endpoints). As one example, the acid-treated carbon fibers can be contacted with the second organic solvent over a time period of about 1 minute to about 12 hours. In some embodiments, the acid-treated carbon fibers can be contacted with the second organic solvent for greater than 12 hours. In some embodiments, the acid-treated carbon fibers can be contacted with the second organic solvent for at least about 5 minutes. Although various non-limiting examples of suitable conditions are described in the disclosed embodiments, the skilled artisan, guided by the teachings of the disclosed embodiments, will appreciate that numerous other conditions may be suitable depending upon various properties of the second organic solvent.

The carbon fibers can be optionally isolated from the second organic solvent (e.g., after completing operation 140 as depicted in FIG. 1). The disclosed embodiments are not limited to any particular technique for isolating the composite. Non-limiting examples of suitable techniques include filtration, centrifugation, and sedimentation. Two or more isolation techniques may be optionally combined. In some embodiments, the isolated carbon fibers can be separable after isolation from the second organic solvent. In some embodiments, the isolated carbon fibers may be substantially free of the thermosetting resin after isolation from the second organic solvent.

Figure 2:
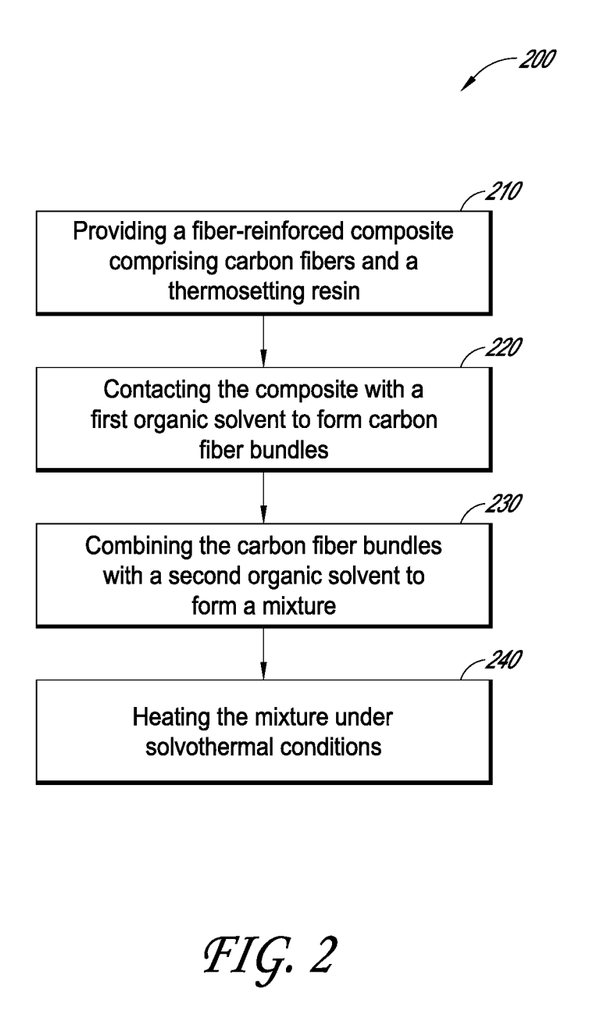
FIG. 2 is a flow diagram illustrating another example of a method of recovering carbon fibers in accordance with at least some examples of the present disclosure.

Some embodiments disclosed herein include alternative methods of recovering carbon fiber from fiber-reinforced composites. FIG. 2 is a flow diagram illustrating one example of method 200 of recovering carbon fibers from fiber-reinforced composite in accordance with at least some examples of the present disclosure. As illustrated in FIG. 2, method 200 can include one or more functions, operations, or actions as illustrated by one or more of operations 210-240.

Method 200 can begin at operation 210, "Providing a fiber-reinforced composite comprising carbon fibers and a thermosetting resin." Operation 210 can be followed by operation 220, "Contacting the composite with a first organic solvent to form carbon fiber bundles." Operation 220 can be followed by operation 230, "Combining the carbon fiber bundles with a second organic solvent to form a mixture." Operation 230 can be followed by operation 240, "Heating the mixture under solvothermal conditions."

In FIG. 2, operations 210-240 are illustrated as being performed sequentially with operation 210 first and operation 240 last. It will be appreciated however that these operations may be reordered, combined, and/or divided into additional or different operations as appropriate to suit particular embodiments. For example, additional operations can be added before, during or after one or more of operations 210-240. In some embodiments, one or more of the operations can be performed at about the same time.

At operation 210, "Providing a fiber-reinforced composite comprising carbon fibers and a thermosetting resin," the thermosetting resin can include an epoxy resin or a phenol resin in some embodiments. In some embodiments, the fiber-reinforced composite is a carbon-fiber-reinforced composite. In some embodiments, the thermosetting resin may be an epoxy resin present in the fiber-reinforced composite as a polymer matrix.

Operation 220, "Contacting the composite with a first organic solvent to form carbon fiber bundles," can include, for example, maintaining the composite and the first organic solvent at a suitable temperature over a time period sufficient for forming carbon fiber bundles. For example, the composite can contact the first organic solvent for a time period of about 1 minute to about 48 hours, of about 10 hours to about 48 hours, or of about 4 hours to about 24 hours. In some embodiments, the composite can contact the first organic solvent, for example, at least about 30 minutes; at least about 1 hour; at least about 4 hours; at least about 12 hours; at least about 24 hours, or at least about 48 hours. In some embodiments, the composite can contact the first organic solvent, for greater than 48 hours. The composite can contact the first organic solvent for a time period of, for example, less than or equal to about 100 hours; less than or equal to about 48 hours; less than or equal to about 24 hours; or less than or equal to about 12 hours. In some embodiments, the composite can be heated with the first organic solvent, for example, to about 15° C., at about 20° C., to about 25° C., about 30° C., about 40° C., about 50° C., about 60° C., about 70° C., or a range between any two of these values (including endpoints).

The first organic solvent can generally include any at least one organic solvent that can adequately form carbon fiber bundles from the composite. In some embodiments, the first organic solvent can be chloroform, dichloromethane, tetrahydrofuran, meta-xylene, N,N-dimethylformamide, carbon tetrachloride, benzene, toluene, or a mixture thereof. In some embodiments, the first organic solvent may be chloroform. In some embodiments, the first organic solvent may be dichloromethane. In some embodiments, the first organic solvent may be tetrahydrofuran. Although various non-limiting examples of suitable conditions are described in the disclosed embodiments, the skilled artisan, guided by the teachings of the disclosed embodiments, will appreciate that numerous other conditions may be suitable depending upon various properties of the first organic solvent.

At operation 230, "Combining the carbon fiber bundles with a second organic solvent to form a mixture," a solution containing the carbon fiber bundles and the second organic solvent can be prepared for forming recovered carbon fibers. The second organic solvent can generally include any at least one solvent that can adequately be used under solvothermal conditions. In some embodiments, the second organic solvent can be an alcohol, chloroform, dichloromethane, tetrahydrofuran, meta-xylene, N,N-dimethylformamide, carbon tetrachloride, benzene, propanol, toluene, or a mixture thereof. In some embodiments, the second organic solvent may be benzyl alcohol. In some embodiments, the second organic solvent may be propanol. The amount of carbon fiber bundles in the second organic solvent can be, for example, at least about 0.01 mg/mL, at least about 0.1 mg/mL, at least about 0.5 mg/mL, or at least about 1 mg/mL. The amount of carbon fiber bundles in the second organic solvent can be, for example, less than or equal to about 10 g/mL, less than or equal to about 5 g/mL, or less than or equal to 1 g/mL. In some embodiments, the amount of carbon fiber bundles in the second organic solvent is in a first range of about 1 g/mL to about 0.01 g/mL or in a second range of about 0.5 g/mL to about 0.01 g/mL.

At operation 240, "Heating the mixture under solvothermal conditions in the second organic solvent," the mixture can be heated under conditions that are effective to obtain recovered carbon fibers. Generally, the process can include heating the second organic solvent to above a nominal boiling point to obtain a high temperature and a high pressure (e.g., more than about 1 atm) to facilitate the forming of recovered carbon fibers.

As used herein, "nominal boiling point" generally refers to the temperature at which a liquid medium exhibits a phase change to a gas at 1 atm pressure. For example, the nominal boiling point of water is about 100° C.

The mixture can be heated in a sealed chamber at a temperature that is effective to form recovered carbon fibers. The mixture can be heated in the sealed chamber at, for example, at least about 100° C.; at least about 125° C.; at least about 150° C.; at least about 200° C.; at least about 225° C; at least about 250° C.; at least about 300° C.; or at least about 350° C.

The mixture can be heated in the sealed chamber at a temperature of, for example, less than or equal to about 400° C.; less than or equal to about 300° C.; less than or equal to about 250° C.; or less than or equal to about 200° C. In some embodiments, the mixture can be heated in the sealed chamber to a temperature in a first range of about 100° C. to about 350° C., in a second range of about 150° C. to 250° C., or in a third range of about 100° C. to 200° C. In some embodiments, the mixture may be heated to about 240° C., at about 200° C., or at about 150° C. The mixture can also be heated for a time period that is effective to form the recovered carbon fibers. The mixture can be heated for a time period of, for example, at least about 30 minutes; at least about 1 hour; at least about 4 hours; at least about 12 hours; at least about 24 hours, or at least about 48 hours. The mixture can be heated for a time period of, for example, less than or equal to about 100 hours; less than or equal to about 48 hours; less than or equal to about 24 hours; or less than or equal to about 12 hours. In some embodiments, the mixture can be heated for a time period in a first range of about 30 minutes to about 100 hours, in a second range of about 12 hours to about 48 hours, or in a third range of about 1 hour to about 24 hours. In some embodiments, the mixture is heated for about 36 hours, about 24 hours, or about 12 hours. In some embodiments, the mixture is heated for at least about 1 hour or at least about 48 hours.

Heating the mixture in the sealed chamber can also produce an increased pressure. The pressure in the sealed chamber while heating the mixture may reach, for example, more than 1 atm, at least about 5 atm, at least about 10 atm, or at least about 20 atm.

The sealed chamber is not particularly limited and may generally be any inert container that can withstand the temperatures and pressures applied during the process. As a non-limiting example, the sealed chamber may be an autoclave that is heated in a furnace or oven. The volume of the sealed chamber filled with the mixture may also vary. For example, the sealed chamber may be half-filled with the mixture. The amount of the mixture in the sealed chamber by volume relative to a total volume of the sealed chamber can be, for example, at least about 10%, at least about 20%, at least about 40%, at least about 50%, or at least about 60%.

Although various non-limiting examples of suitable conditions are described in the disclosed embodiments, the skilled artisan, guided by the teachings of the disclosed embodiments, will appreciate that numerous other conditions may be suitable depending upon various properties of the second organic solvent in the mixture.

The carbon fibers can be optionally isolated from the mixture (e.g., after completing operation 240 as depicted in FIG. 2). The present disclosure is not limited to any particular technique for isolating the carbon fibers. Non-limiting examples of suitable techniques include filtration, centrifugation, and sedimentation. Two or more isolation techniques may be optionally combined. In some embodiments, the isolated carbon fibers can be separable after isolation from the mixture. In some embodiments, the isolated carbon fibers may be substantially free of the thermosetting resin after isolation from the mixture.

Some embodiments disclosed herein include a composition having an organic solvent, recycled carbon fibers dispersed in the organic solvent, and a thermosetting resin. The composition can be formed, in some embodiments, using the methods described in the disclosed embodiments. For example, the composite can be formed by the method depicted in FIG. 1. The composite can also be formed by the method depicted in FIG. 2. In some embodiments, the recycled carbon fibers, after isolation from the composition, may be separable. The organic solvent can be typical organic solvents, such as, for example, chloroform, dichloromethane, tetrahydrofuran, meta-xylene, N,N-dimethylformamide, carbon tetrachloride, benzene, and toluene. In some embodiments, the thermosetting resin can include an epoxy resin or a phenol resin.

The methods for recovering carbon fibers from a fiber-reinforced composite, in accordance with the disclosed embodiments, can be efficient and rapid. For example, the carbon fibers can be recovered from the composite in no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, or no more than about 30 minutes.

The carbon fibers that are recovered can be clean and substantially undamaged as the methods in accordance with the disclosed embodiments do not involve harsh reagents and high operating temperatures.

The methods as disclosed in the embodiments herein can also be simple to implement, and do not require complex equipment setups. For example, a basic container and a heating device may be applicable, or at most, where solvothermal conditions are required, a hydrothermal reactor may be applicable.

EXAMPLES

Additional embodiments are disclosed in further detail in the following examples, which are not in any way intended to limit the scope of the claims.

Example 1

Figure 3A:
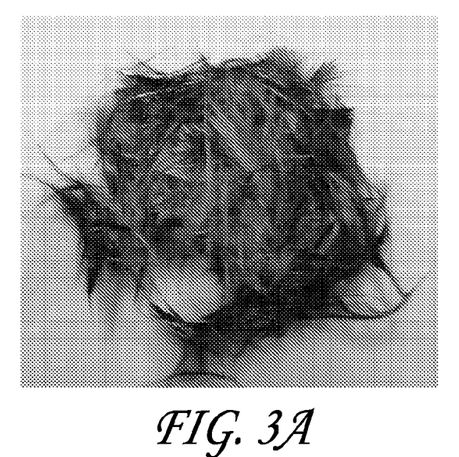
FIGS. 3A-C show digital photo and scanning electron microscopy (SEM) images of resulting recovered carbon fibers as prepared in Example 1.
Figure 3B:
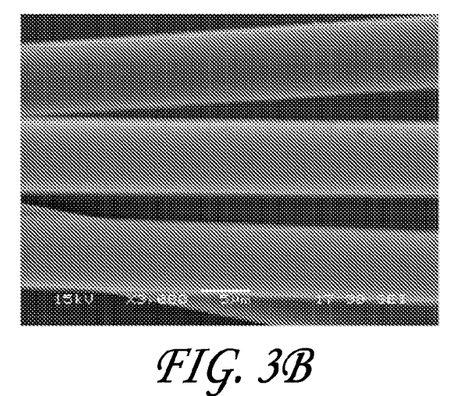
Figure 3C:
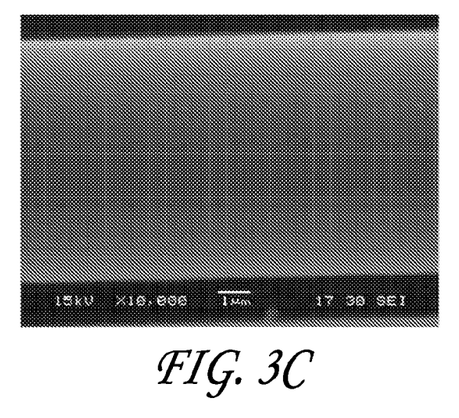

Recovery of Carbon Fibers Using Alcohol and Nitric Acid 1.0 g of carbon fiber reinforced composite was cut into small pieces and added into 10 ml of benzyl alcohol. The mixture was heated in a container open to air and placed in an oil bath at 150° C. for 6 hours. The softened carbon fiber reinforced composite was removed from the benzyl alcohol and divided into thin strips. The strips were placed into a 6 mol/L solution of nitric acid and heated in a water bath at a temperature of 70° C. for 100 minutes. The acidic solution was filtered, and the resultant carbon fiber bundles were added to benzyl alcohol, which was then heated at 150° C. for 1 hour. The mixture was filtered, and the carbon fibers were washed with absolute ethanol, yielding recovered carbon fibers. FIGS. 3A-C show a digital photo, a scanning electron microscopy (SEM) image (of 3000× magnification), and another SEM image (of 10000× magnification), respectively, taken of the resulting recovered carbon fibers. The images show recovered carbon fibers that are not damaged, as can be observed from the smooth surfaces of the fibers, and the lack of defects such as cracks, pits, indentations and scratches in the surfaces of the fibers.

For comparison, FIGS. 4A-E depict carbon fibers recovered from carbon fiber reinforced composites using other treatment methods.

Figure 4A:
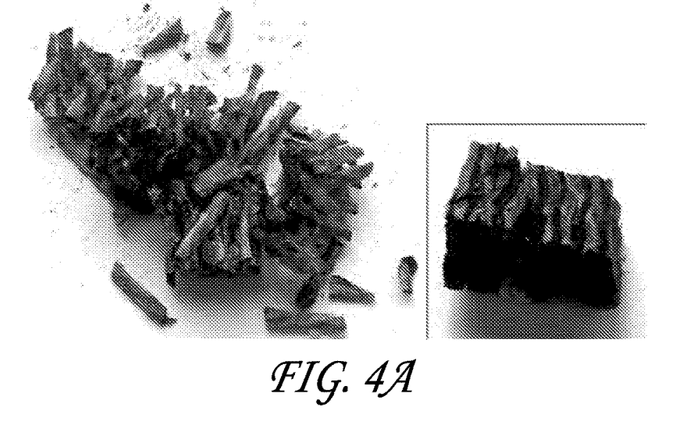
FIGS. 4A-E show digital photos and SEM images of carbon fibers before treatment and carbon fibers obtained by thermal treatment with benzyl alcohol alone at 150° C. for 6 hours.
Figure 4B:
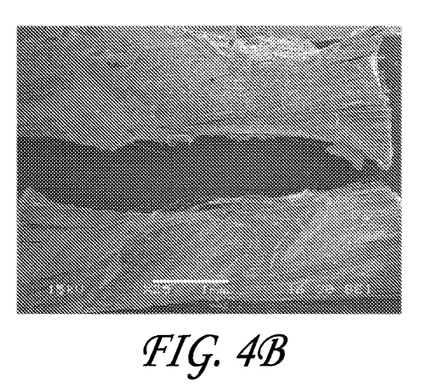
Figure 4C:
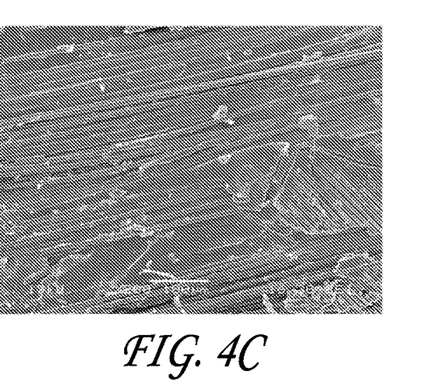
Figure 4D:
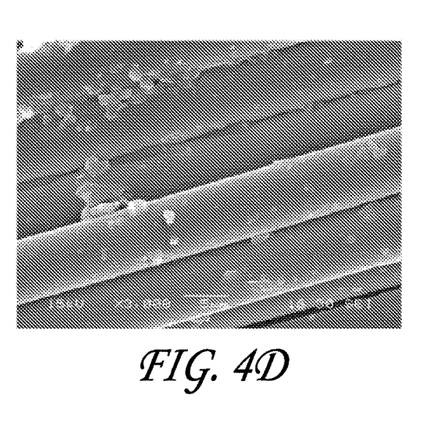
Figure 4E:
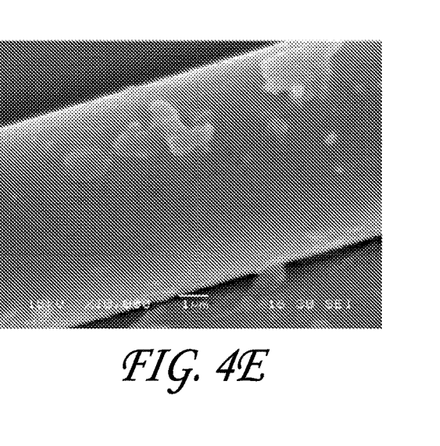

FIGS. 4A-E depict carbon fibers obtained by thermal treatment with benzyl alcohol alone at 150° C. for 6 hours. FIG. 4A shows a digital photo of the carbon fibers after the carbon fibers are cut into pieces; the digital photo also shows as an inset a sample obtained after the treatment. FIGS. 4B-E show SEM pictures of the carbon fibers at 20× magnification, 200× magnification, 3000× magnification, and 10000× magnification, respectively. As can be observed from FIGS. 4A-E, the surface of the carbon fibers are damaged with defects such as cracks, pits, indentations and scratches. The carbon fibers, as can be seen in FIG. 4A do not appear separable as compared to FIG. 3A.

Figure 5A:
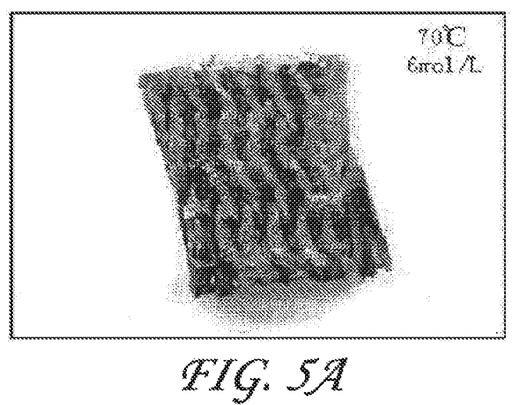
FIGS. 5A-I depict digital photos and SEM images of carbon fibers obtained using nitric acid solutions at different concentrations and at different temperatures.
Figure 5B:
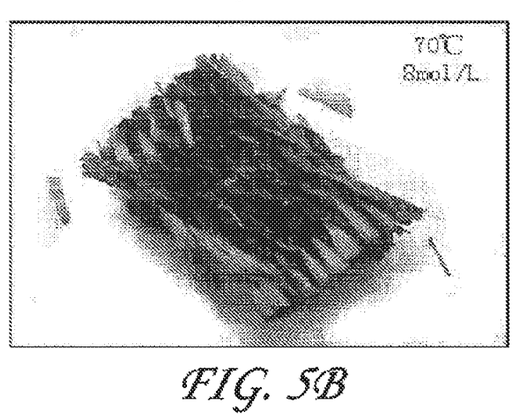
Figure 5C:
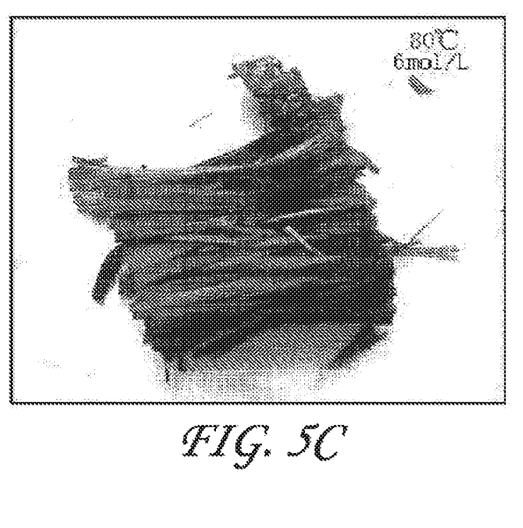
Figure 5D:
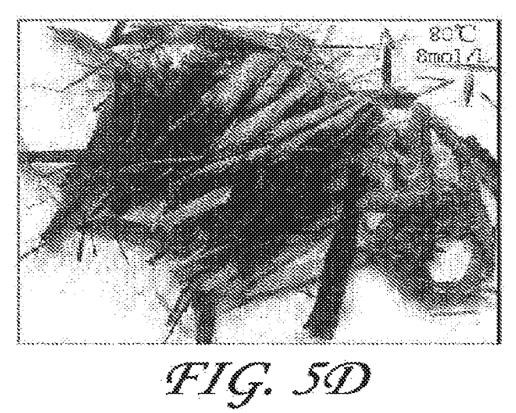
Figure 5E:
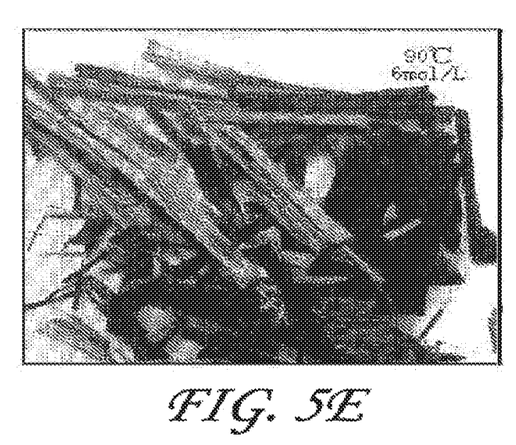
Figure 5F:
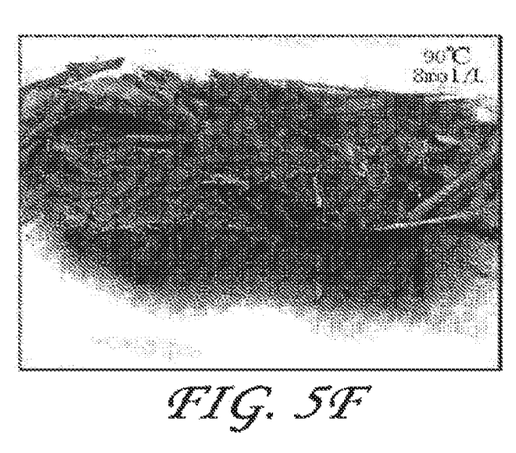
Figure 5G:
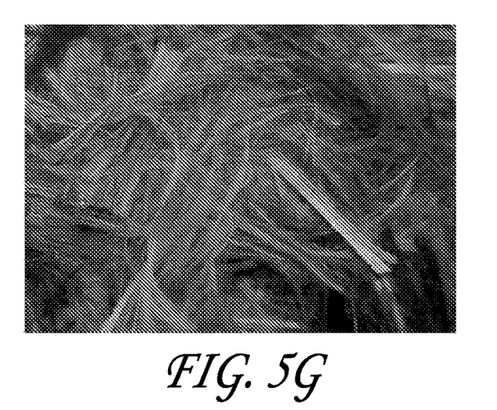
Figure 5H:
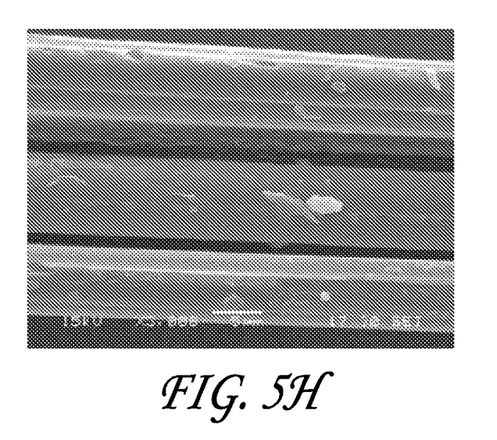
Figure 5I:
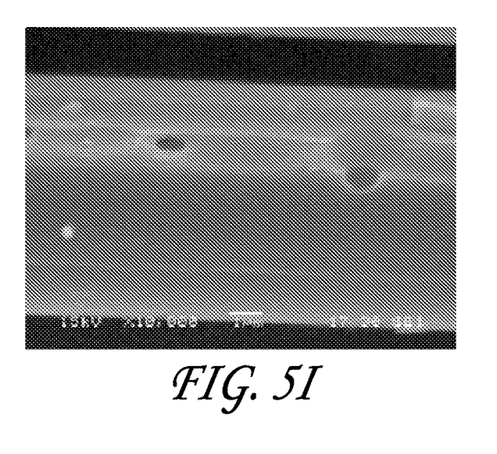

FIGS. 5A-I depict digital photos and SEM images of carbon fibers obtained by using nitric acid alone at different concentrations and at different temperatures. FIGS. 5A-F depict digital photos of carbon fibers obtained by using 6 mol/L nitric acid at 70° C., 8 mol/L nitric acid at 70° C., 6 mol/L nitric acid at 80° C., 8 mol/L nitric acid at 80° C., 6 mol/L nitric acid at 90° C., 8 mol/L nitric acid at 90° C., respectively. FIGS. 5G-I depict a digital photo, an SEM image (of 3000× magnification), and another SEM image (of 10000× magnification), respectively, of carbon fibers obtained by using 8 mol/L nitric acid at 80° C. As can be seen from FIGS. 5A-G, the carbon fibers obtained from treatment with nitric acid alone do not appear separable. FIGS. 5B and C also show defects such as cracks, pits, indentations and scratches on the surface of the fibers.

Figure 6A:
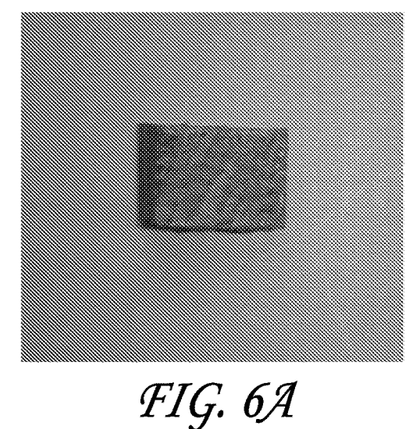
FIGS. 6A-F show digital photos and SEM images of carbon fibers before treatment and carbon fibers obtained by supercritical recovery with n-propanol.
Figure 6B:
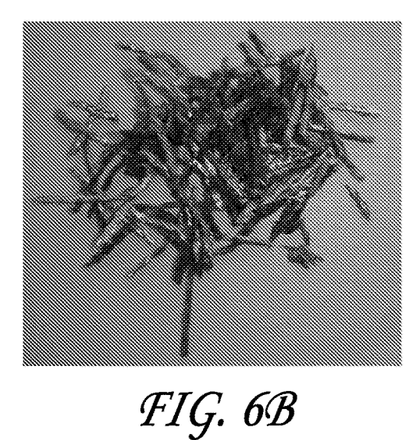
Figure 6C:
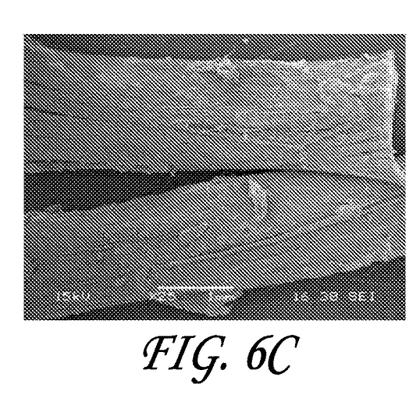
Figure 6D:
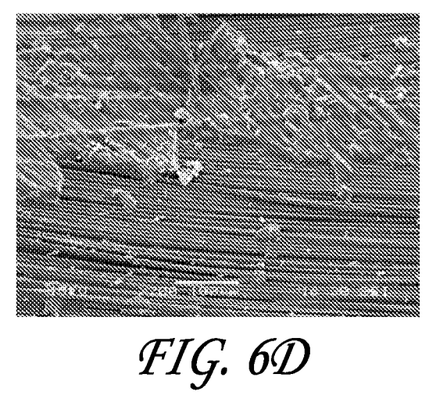
Figure 6E:
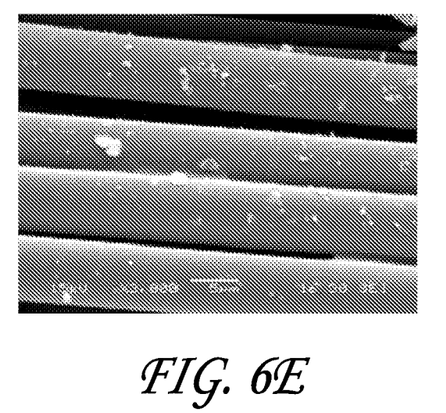
Figure 6F:
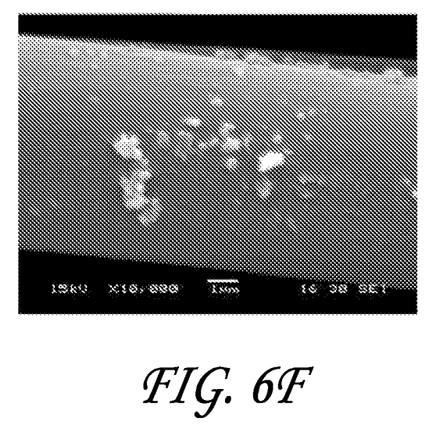

FIGS. 6A-F show a digital photo of a carbon fiber reinforced composite before treatment and digital photos and SEM images of carbon fibers obtained by supercritical recovery with n-propanol at a temperature range of about 258.9° C. to about 274° C., and at a pressure of about 5.7-6.9 MPa, for 4 hours. FIGS. 6A-B depict a digital photo of a carbon fiber reinforced composite before treatment and a digital photo of carbon fibers obtained after the treatment, respectively. It can be observed that the carbon fibers obtained after the treatments are in thick bundles and not in the form of separated strands of fibers like in FIG. 3A. FIGS. 6C-F depict SEM images of the carbon fibers after the treatment at 20× magnification, 200× magnification, 3000× magnification, and 10000× magnification, respectively. Defects such as cracks, pits, indentations and scratches can be observed on the surface of the carbon fibers.

Example 2

Recovery of Carbon Fibers Using an Organic Solvent Under Solvothermal Conditions 1.0 g of carbon fiber reinforced composite was cut into small pieces and immersed in 5 ml of chloroform for 19 hours, to yield carbon fiber bundles. The carbon fiber bundles were added to propanol, and the mixture was transferred to an inner tank of a hydrothermal reactor such that a ratio of the volume of the mixture to the total volume of the sealed chamber was no more than 2:3. The inner tank was covered and sealed, and was positioned in a stainless steel outer jacket. The mixture was heated to a temperature of 240° C. and maintained at the temperature for 24 hours, resulting in fully isolated carbon fibers.

Figure 7A:
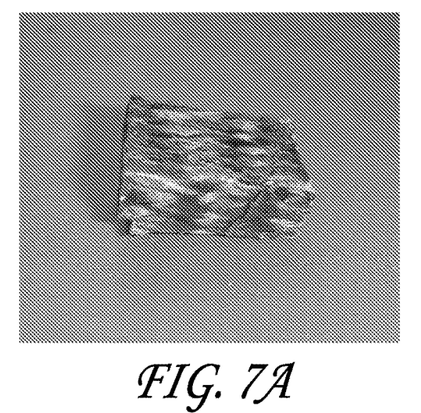
FIG. 7 shows digital photos of carbon fibers at different treatment stages as described in Example 2.
Figure 7B:
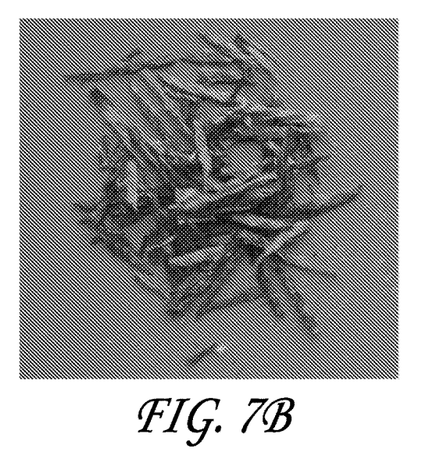
Figure 7C:
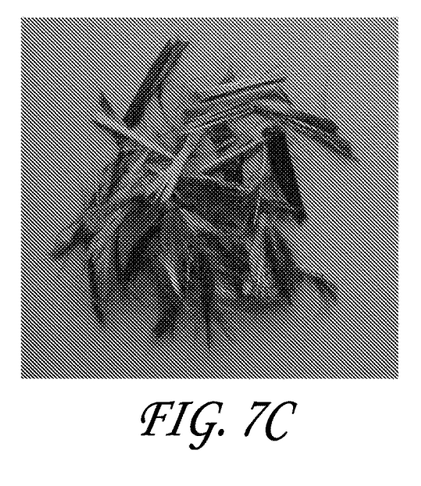

FIG. 7A-C show digital photos of carbon fibers at different treatment stages of this example. FIG. 7A depicts the carbon fiber before treatment, FIG. 7B depicts the carbon fiber after being immersed in chloroform for 19 hours, and FIG. 7C depicts fully isolated carbon fiber after immersion in chloroform for 19 hours and solvothermal treatment with propanol at 240° C. for 24 hours. As can be seen from FIG. 7C, the recovered carbon fibers appear as separated thin strands of fibers.

Example 3

Recovery of Carbon Fibers Using an Organic Solvent and Alcohol Under Solvothermal Conditions 1.0 g of carbon fiber reinforced composite was cut into small pieces and immersed in 5 ml of dichloromethane for 42 hours, to yield carbon fiber bundles. The carbon fiber bundles were placed into 10 ml of benzyl alcohol, and the mixture was transferred into an inner tank of a hydrothermal reactor such that a ratio of the volume of the mixture to the total volume of the sealed chamber is no more than 2:3. The inner tank was covered and sealed, and was positioned in a stainless steel outer jacket. The mixture was heated to a temperature of 240° C. and maintained at the temperature for 24 hours, resulting in fully isolated carbon fibers.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances, where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method of recovering carbon fibers from fiber-reinforced composite, the method comprising:
   providing the fiber-reinforced composite comprising the carbon fibers and a thermosetting resin;
   contacting the fiber-reinforced composite with a first organic solvent including an alcohol to form carbon fiber bundles from the fiber-reinforced composite;
   after contacting the fiber-reinforced composite with the first organic solvent, contacting the carbon fiber bundles with an acid solution to form acid-treated carbon fibers; and
   contacting the acid-treated carbon fibers with a second organic solvent.

2. The method of claim 1, wherein the thermosetting resin comprises an epoxy resin or a phenol resin.

3. The method of claim 1, wherein the alcohol of the first organic solvent includes benzyl alcohol.

4. The method of claim 1, wherein the second organic solvent includes an alcohol.

5. The method of claim 4, wherein the second organic solvent includes benzyl alcohol.

6. The method of claim 1, wherein contacting the fiber-reinforced composite with the first organic solvent comprises heating the fiber-reinforced composite and the first organic solvent to a temperature of about 50° C. to about 200° C.

7. The method of claim 1, wherein contacting the acid-treated carbon fibers with the second organic solvent comprises heating the acid-treated carbon fibers and the second organic solvent to a temperature of about 50° C. to about 200° C.

8. The method of claim 1, wherein the acid solution comprises nitric acid.

9. The method of claim 1, wherein contacting the carbon fiber bundles with the acid solution comprises heating the carbon fiber bundles and the acid solution to a temperature of at least about 40° C.

10. The method of claim 1, further comprising isolating the carbon fibers from the second organic solvent.

11. The method of claim 10, wherein the carbon fibers, after isolating from the second organic solvent, are separable and substantially free of the thermosetting resin.

12. A method of recovering carbon fibers from fiber-reinforced composite, the method comprising:
   providing the fiber-reinforced composite comprising the carbon fibers and a thermosetting resin;
   contacting the fiber-reinforced composite with a first organic solvent to form carbon fiber bundles from the fiber-reinforced composite;
   combining the carbon fiber bundles with a second organic solvent to form a mixture;
   heating the mixture under solvothermal conditions; and
   isolating the carbon fibers from the mixture.

13. The method of claim 12, wherein the thermosetting resin comprises an epoxy resin or a phenol resin.

14. The method of claim 12, wherein the first organic solvent comprises one or more of chloroform, dichloromethane, tetrahydrofuran, meta-xylene, N,N-dimethylformamide, carbon tetrachloride, benzene, or toluene.

15. The method of claim 12, wherein the second organic solvent comprises one or more of an alcohol, chloroform, dichloromethane, tetrahydrofuran, meta-xylene, N,N-dimethylformamide, carbon tetrachloride, benzene, or toluene.

16. The method of claim 12, wherein the first organic solvent includes dichloromethane and the second organic solvent includes benzyl alcohol.

17. The method of claim 12, wherein the first organic solvent includes chloroform and the second organic solvent includes propanol.

18. The method of claim 12, wherein heating the mixture under solvothermal conditions occurs in a sealed chamber.

19. The method of claim 12, wherein heating the mixture under solvothermal conditions comprises heating the mixture to a temperature of about 150° C to about 250° C.

20. The method of claim 12, wherein the carbon fibers, after isolating from the mixture, are separable and substantially free of the thermosetting resin.

21. A composition comprising:
  a non-acidic organic solvent solution, wherein the non-acidic organic solvent comprises one or more of chloroform, dichloromethane, tetrahydrofuran, meta-xylene, N,N-dimethylformamide, carbon tetrachloride, benzene, or toluene;
  recycled carbon fibers dispersed in the non-acidic organic solvent; and
  a thermosetting resin at least partially dissolved in the non-acidic organic solvent.

22. The composition of claim 21, wherein the thermosetting resin comprises an epoxy resin or a phenol resin.

* * * * *